United States Patent
Heo (10) Patent No.: US 8,248,391 B2
(45) Date of Patent: Aug. 21, 2012

(54) MOBILE COMMUNICATION DEVICE AND OPERATING METHOD THEREOF

(75) Inventor: Jeong Yun Heo, Seoul (KR)

(73) Assignee: LG Electronics Inc., Seoul (KR)

( * ) Notice: Subject to any disclaimer, the term of this patent is extended or adjusted under 35 U.S.C. 154(b) by 955 days.

(21) Appl. No.: 12/113,818

(22) Filed: May 1, 2008

(65) Prior Publication Data

US 2008/0273020 A1    Nov. 6, 2008

(30) Foreign Application Priority Data

May 3, 2007    (KR) ................. 10-2007-0043223

(51) Int. Cl.
*G06F 3/033*    (2006.01)
*G06F 3/041*    (2006.01)
*G09G 5/00*    (2006.01)
*G09G 5/08*    (2006.01)

(52) U.S. Cl. ......... 345/184; 345/157; 345/160; 345/173

(58) Field of Classification Search ........... 345/156–184
See application file for complete search history.

(56) References Cited

U.S. PATENT DOCUMENTS

| 4,394,649 | A | * | 7/1983 | Suchoff et al. | 345/168 |
| 5,680,312 | A | * | 10/1997 | Oshizawa et al. | 701/202 |
| 6,097,964 | A | * | 8/2000 | Nuovo et al. | 345/167 |
| 2002/0190946 | A1 | * | 12/2002 | Metzger | 345/156 |
| 2005/0225531 | A1 | * | 10/2005 | Cheng | 345/163 |
| 2006/0181511 | A1 | * | 8/2006 | Woolley | 345/160 |
| 2007/0262951 | A1 | * | 11/2007 | Huie et al. | 345/156 |

* cited by examiner

*Primary Examiner* — Bipin Shalwala
*Assistant Examiner* — Ryan A Lubit
(74) *Attorney, Agent, or Firm* — Birch, Stewart, Kolasch & Birch, LLP

(57) ABSTRACT

The present invention relates to a mobile communication device, method and computer program product for controlling a displayed screen using a rotary input device and an operating method thereof. The mobile communication terminal according to an embodiment includes a first input key, a second input key, a third input key, and a controller. The first input key generates a first signal when the first input key is turned. The second input key generates a second signal when the second input key is activated after the first signal is generated. The third input key generates a third signal when the third input key is activated after the first signal is generated. The controller controls a predetermined operation on a displayed screen based on at least one of the first signal, the second signal, and the third signal.

12 Claims, 8 Drawing Sheets

MOBILE COMMUNICATION DEVICE AND OPERATING METHOD THEREOF

CROSS REFERENCE TO RELATED APPLICATIONS

This application claims the benefit of Korean Application No. 10-2007-0043223, filed on May 3, 2007 in the Korean Intellectual Property Office, the disclosure of which is incorporated herein by reference.

BACKGROUND OF THE INVENTION

1. Field of the Invention

The present invention relates to a mobile communication device, method and computer program product for controlling a displayed screen using a rotary input device and an operating method thereof.

2. Description of the Background Art

According to the performance improvement of a mobile communication terminal and the introduction of various mobile platforms, a mobile communication terminal became enabled to provide diverse supplementary services as well as basic functions such as a short message service (SMS). Lately, the performance of the mobile communication terminal has been further improved and the internal storage capacity of a mobile communication terminal has increased while a mobile communication terminal supporting a wireless Internet or a multimedia function has been commercialized.

Since portability and mobility are the major characteristics of a mobile communication terminal, a limited space is typically available for use as an input device or an output device of a mobile communication terminal. In order to effectively use the limited space, various functional keys have been introduced for a mobile communication terminal. For example, a rotary input device was introduced for a mobile communication terminal. The rotary input device may be a rotary key or wheel key.

A conventional rotary input device is generally used as an up and down directional key or a menu selection key. Conventional devices have a limited ability to search information stored in a mobile communication terminal when using only the rotary input device. For example, if thousands addresses are stored in a mobile communication terminal, a user must repeatedly turn the rotary key or the wheel key to scroll an address list for searching a desired address.

In order to effectively search a desired address from such a long list, an acceleration search function is needed. Therefore, it is necessary to develop a method for effectively controlling the operation of a mobile communication terminal while maintaining the advantages of the rotary key or the wheel key.

SUMMARY OF THE INVENTION

Accordingly, an aspect of the present invention is to solve at least the problems and disadvantages of the background art. In accordance with an aspect of the present invention, there is a mobile communication terminal that includes a first input key, a second input key, a third input key, and a controller. The first input key generates a first signal when the first input key is turned. The second input key generates a second signal when the second input key is activated after the first signal is generated. The third input key generates a third signal when the third input key is activated after the first signal is generated. The controller controls a predetermined operation on a displayed screen based on at least one of the first signal, the second signal, and the third signal.

In accordance with another aspect of the present invention, there is a computer program product and a method of operating a mobile communication terminal include generating a first signal when a first input key for rotary input is turned, generating a second signal when a second input key is activated after the first signal is generated, generating a third signal when a third input key is activated after the first signal is generated, and controlling a predetermined operation on a displayed screen based on at least one of the first signal, the second signal, and the third signal.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

It is an object of the present invention to provide a mobile communication device, method and computer program product for controlling a displayed screen in various ways using a rotary input device and an operating method thereof.

Preferred embodiments of the present invention will be described in a more detailed manner with reference to the drawings.

Figure 1:
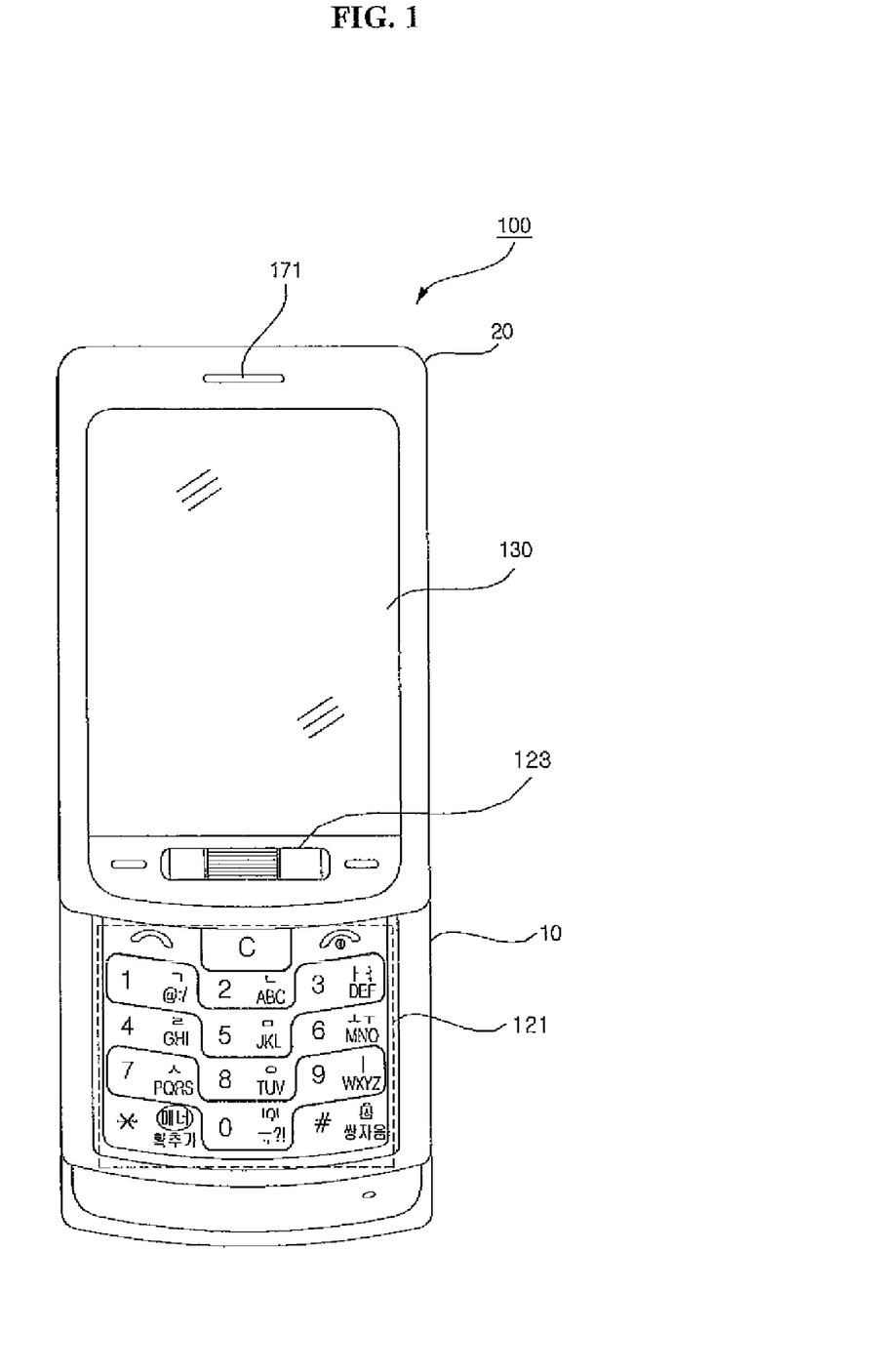
FIG. 1 and FIG. 2 are diagrams illustrating a mobile communication terminal according to an embodiment of the present invention.
Figure 2:
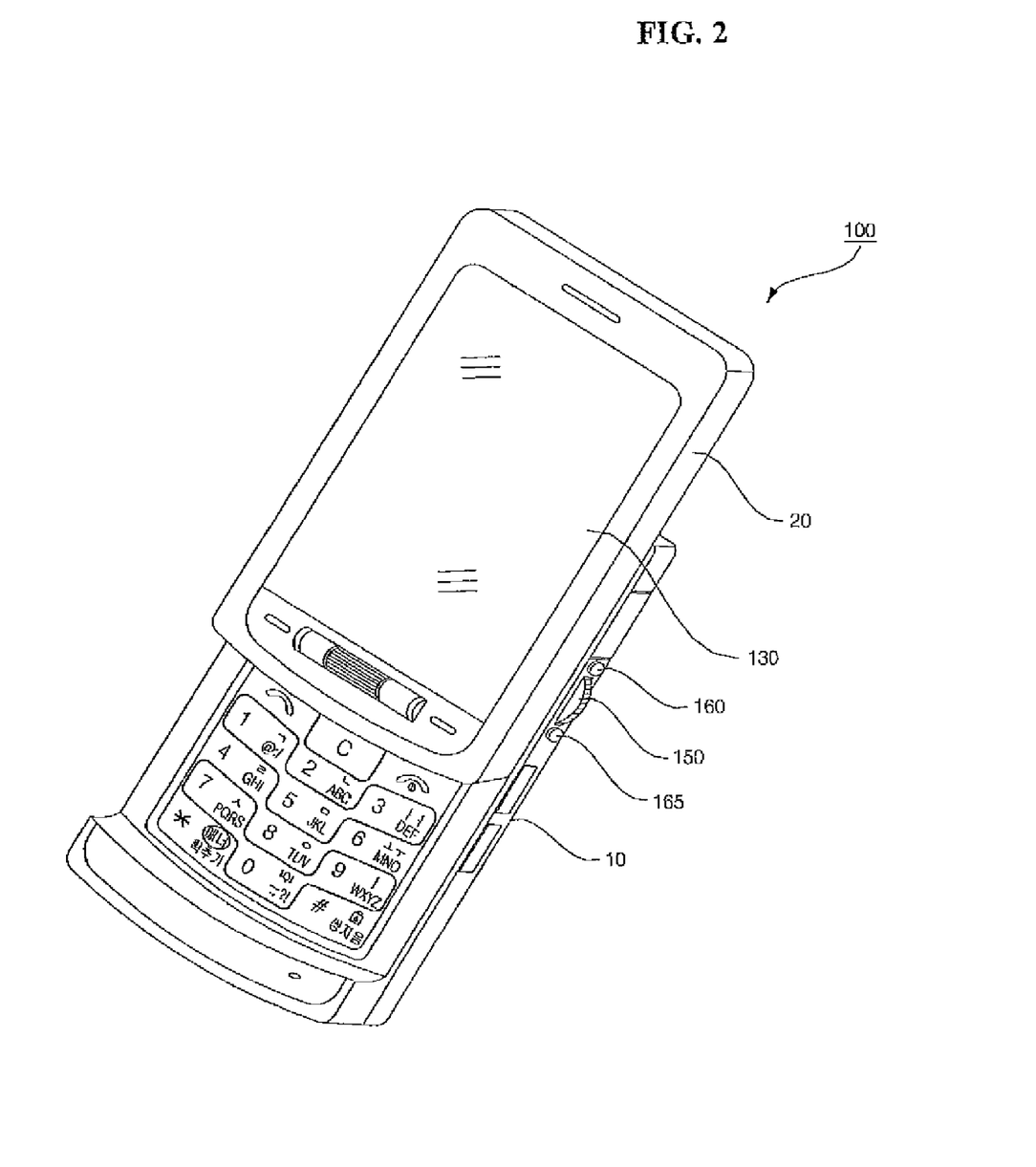
Figure 3:
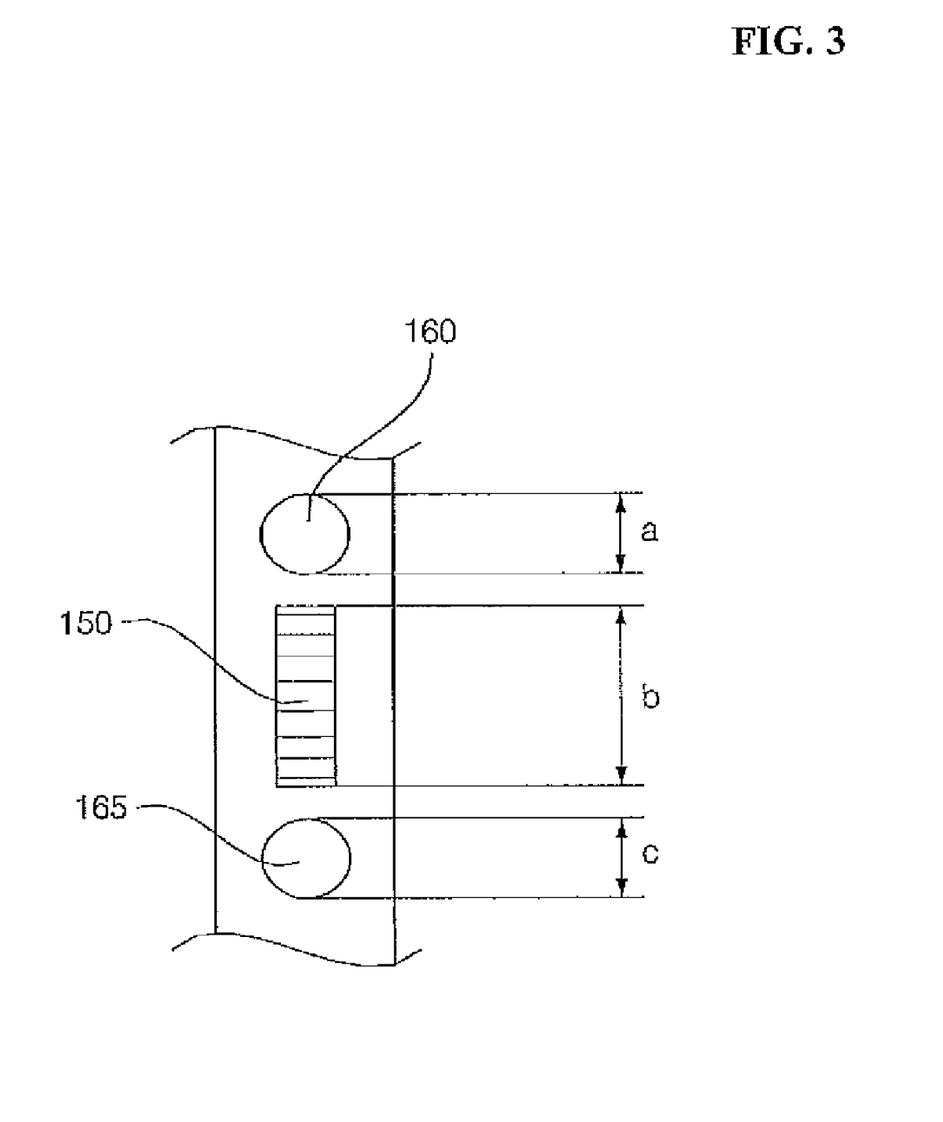
FIG. 3 is a diagram illustrating first to third input keys of a mobile communication terminal according to an embodiment of the present invention.

FIG. 1 and FIG. 2 are diagrams illustrating a mobile communication terminal according to an embodiment of the present invention. FIG. 3 is a diagram illustrating first to third input keys of a mobile communication terminal according to an embodiment of the present invention.

Referring to FIG. 1 through FIG. 3, a mobile communication terminal 100 includes a main body 10, and a cover 20 slidably coupled to the main body 10. The cover 20 slides up and slide down along the main body 10. The cover 20 includes a display unit 130 using a liquid crystal display (LCD), a speaker 171 for outputting a voice of an opponent, and a keypad 121 and a rotary key 123 as an input device.

A first input key 150 is disposed at a side of the main body 10. The first input key 150 is a wheel button which is a rotary input with a button function. A second input key 160 and a third input key 165 are disposed at a top and a bottom of the first input key 150, which are activated by touching or pushing.

A proximity sensor may be used as the second and third input keys 160 and 165. In this case, the second and third input keys 160 and 165 may generate an input signal when a finger of a user approaches to one of the second and third input keys 160 and 165. As shown in FIG. 37 the proximity sensors are disposed in an area A and an area C as the second and third input keys 160 and 165. When a finger of a user approaches to the area A or the area C, the second input key 160 and the third input key 165 generate an input signal. The first input key 150 is disposed in an area B and is configured to receive a rotary input.

Figure 4:
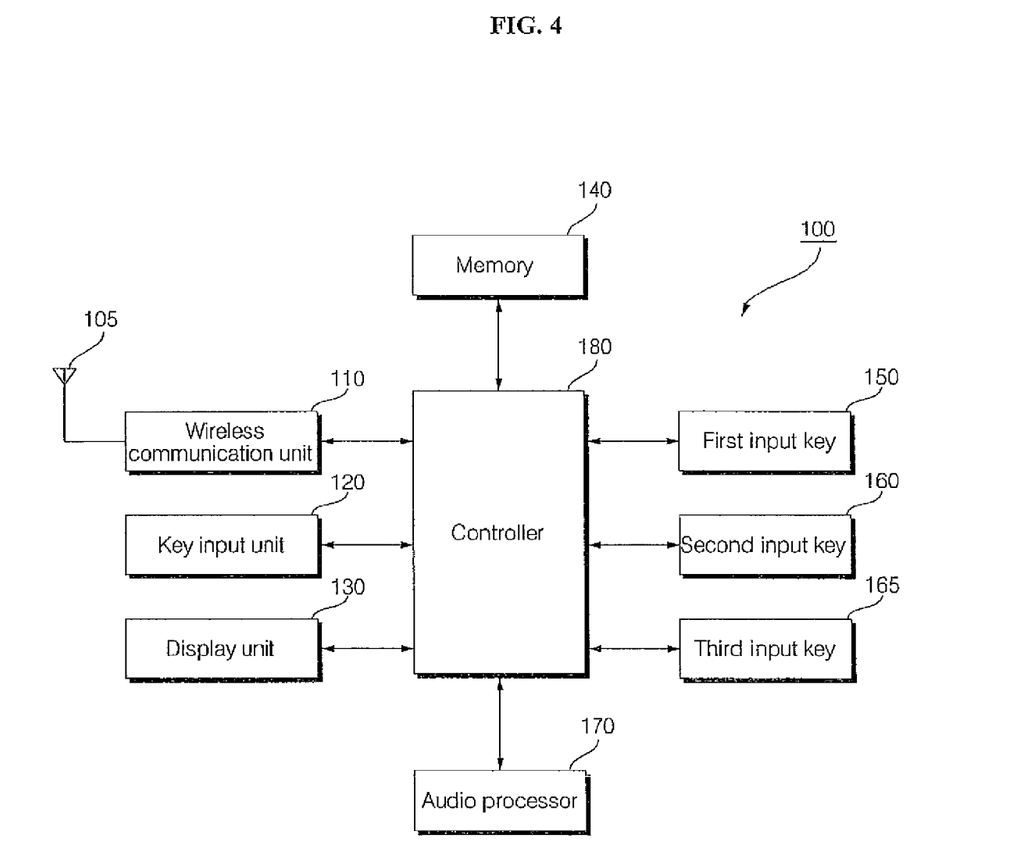
FIG. 4 is a block diagram of a mobile communication terminal according to an embodiment of the present invention.

FIG. 4 is a block diagram of a mobile communication terminal according to an embodiment of the present invention.

Referring to FIG. 4, the mobile communication terminal 100 includes a wireless communication unit 110, a key input unit 120, a display unit 130, a memory 140, a first input key 150, a second input key 160, a third input key 165, an audio processor 170, and a controller 180.

The wireless communication unit 110 provides an interface for wirelessly communicating with a base station through an antenna 105. The wireless communication unit 110 includes a duplexer filter for separating a transmitting and receiving signal, a power amplifier (amp) for amplifying a transmitting signal, a frequency up conversion circuit of a transmitting path, and a frequency down conversion circuit of a receiving path.

The key input unit 120 includes a plurality of keys including a keypad 121 and a rotary key 123. The key input unit 120 receives instructions and data from a user by transferring a signal to the controller 180 corresponding to a key activated by a user. The display unit 130 includes a liquid crystal display (LCD) screen. The display unit 130 displays information about a menu for controlling operations, a state of receiving a signal from an opponent, a battery state, and operating states of a mobile communication terminal according to instructions input by a user. The memory 140 stores a program and data for operating a mobile communication terminal and diverse user data.

The first input key 150 is a key for receiving rotary input, such as a wheel button, a wheel key, and a rotary key. The first input key 150 outputs a first signal that indicates a turning direction and the amount of turn. The second and third input keys 160 and 165 output a second signal and a third signal when the second and third input keys 160 and 165 are activated by pushing, touching, or other types of actions. The first input key 150 may output a fourth signal when the first input key 150 is vertically pushed. In this case, the fourth signal outputted from the first input key 150 may be used as a signal equivalent to the input of a selection key.

The audio processor 170 amplifies an audio signal from the control unit 180 and outputs the amplified audio signal to the speaker 171. The audio processor 170 also converts an audio signal input through a microphone (not shown) to an electric signal and transfers the electric signal to the controller 180.

The controller 180 controls the overall operation of a mobile communication terminal by controlling the constituent elements of the mobile communication terminal. Particularly, the controller 180 combines signals from the first to third input keys 150, 160, and 165, and controls the mobile communication terminal in various ways.

Figure 5:
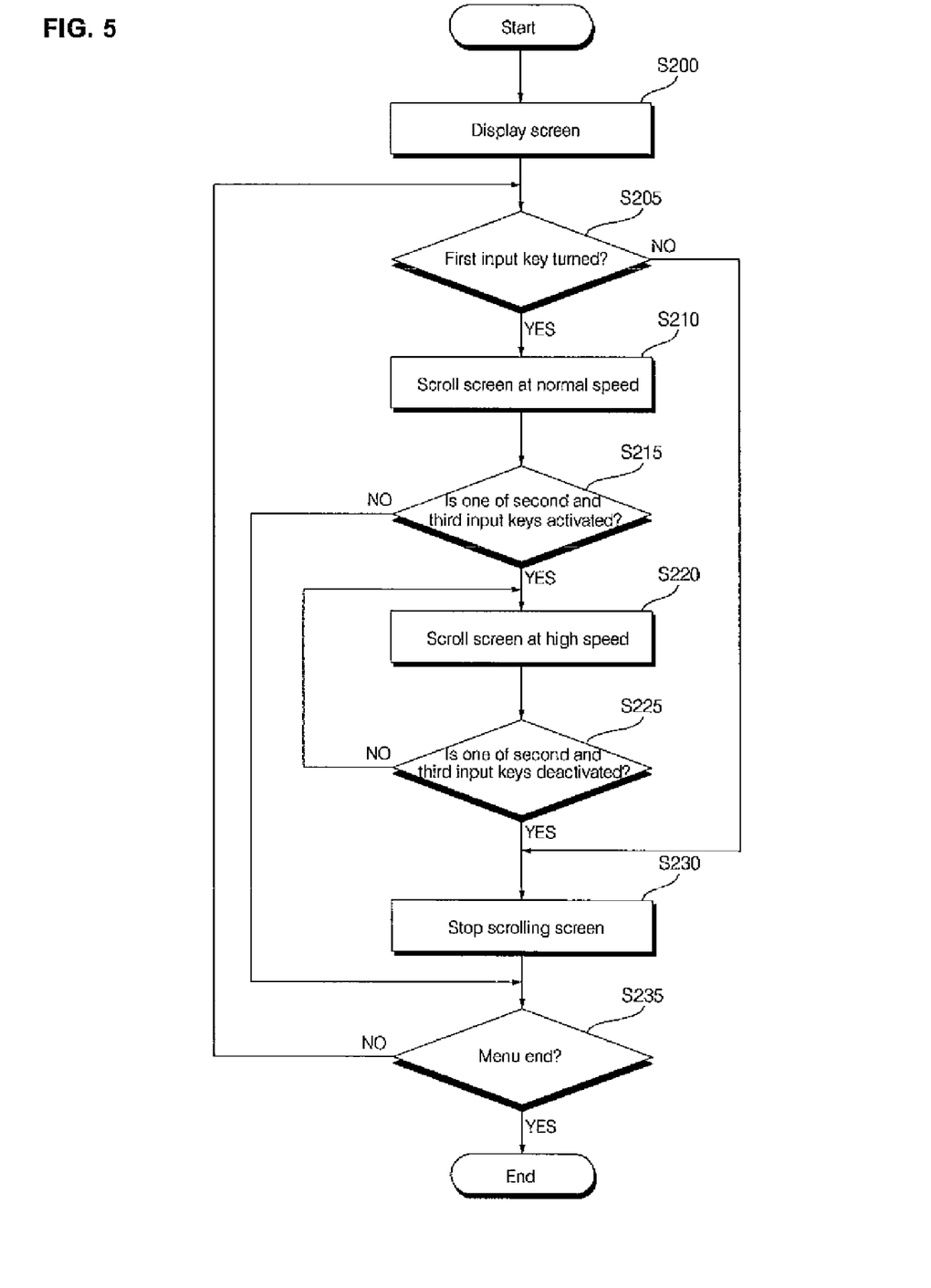
FIG. 5 is a flowchart of an operating method for a mobile communication terminal according to an embodiment of the present invention.

FIG. 5 is a flowchart of an operating method for a mobile communication terminal according to an embodiment of the present invention.

Referring to FIG. 5, when a user selects a predetermined menu through a key input unit 120, a display unit 130 displays a predetermined screen corresponding to the selected menu in response to the control of the controller 180 in operation S200.

If a user turns the first input key 150 after the predetermined screen is displayed on the display unit 130, the controller 180 controls the displayed screen to be scrolled at a first speed in operation S210. Here, the displayed screen can be scrolled in an upward direction and a downward direction or a right direction and a left direction corresponding to the turning direction of the first input key 150.

When a user activates the second input key 160 or the third input key 165 after turning the first input key 150 in operation S215, the controller 180 controls a displayed screen at a second speed in operation S220. Here, the second speed is faster than the first speed. The displayed screen is scrolled in an upward direction when the user activates the second input key 160, and the displayed screen is scrolled in a downward direction when the user activates the third input key 165. On the contrary, the displayed screen may be scrolled in an upward direction when the user actives the third input key 165 and the displayed screen may be scrolled in a downward direction when the user activates the second input key 160. Also, the displayed screen may be scrolled in a left or a right direction instead of the upward and downward directions in response to the input of the second input key 160 and the third input key 165 according to an operating menu or a state of a displayed screen.

While a user is activating the second and third input keys 160 and 165, the speed of scrolling the displayed screen is accelerated to a second speed. If the user stops activating the second and third input keys 160 and 165, the controller 180 stops scrolling the displayed screen in operations S225 and S230. Here, the scrolling speed may increase in proportion to a time of activating the second and third input keys 160 and 165. Also, if a user stops activating the second and third input keys 160 and 165 while the displayed screen is being scrolling, the scrolling of the displayed screen stops slowly by gradually decreasing the speed of scrolling the displayed screen instead of instantly stopping scrolling the displayed screen.

The screen scrolling speed can be controlled through the first input key 150 and the second and third input keys 160 and 165 by repeatedly performing the above operations until the selected menu ends. Also, a user may move a pointing cursor displayed on a screen at different speed through the first input key 150 and the second and third input keys 160 and 165. When a user pushes the first input key 150, an item indicated by a pointing cursor displayed on a screen may be selected.

Figure 6:
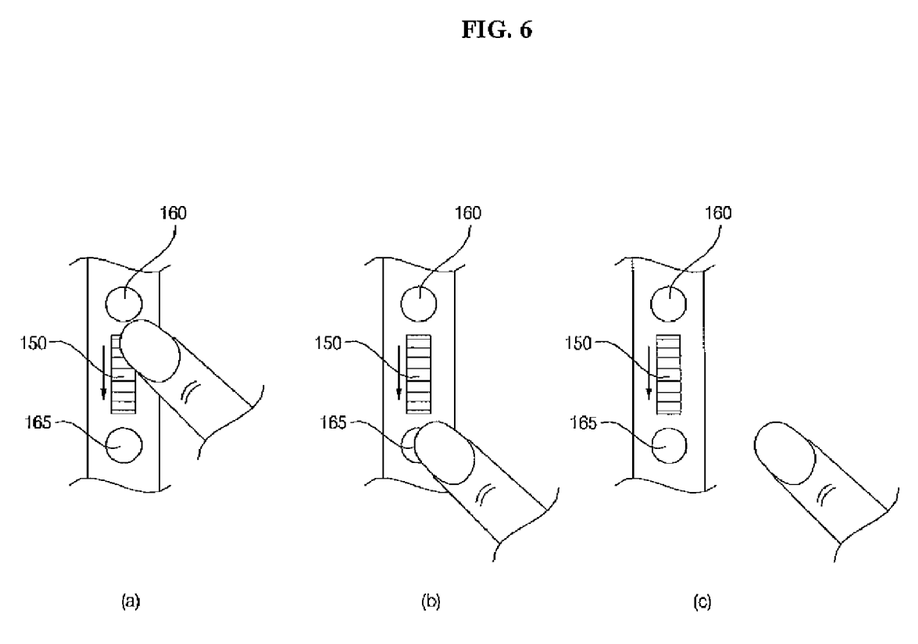
FIG. 6 is a diagram describing a method for controlling input keys in an operating method of a mobile communication terminal according to an embodiment of the present invention.

FIG. 6 is a diagram for describing a method for controlling input keys in an operating method of a mobile communication terminal according to an embodiment of the present invention.

As shown in a diagram (a) of FIG. 6, if a user turns a wheel of the first input key 150 in a downward direction, a screen is scrolled down. If a user pushes the third input key 165 or puts a finger closer to the third input key 165 as shown in a diagram (b) of FIG. 6 after turning the wheel of the first input key 150 in the downward direction, the speed of scrolling the screen is accelerated. If a user wants to stop scrolling, the user removes a finger from the third input key 165 as shown in a diagram (c) of FIG. 6. Then, the scrolling of the screen stops gradually. As described above, the speed of scrolling a screen can change by controlling the first input key 150 and the second and third input keys 160 and 165.

Figure 7:
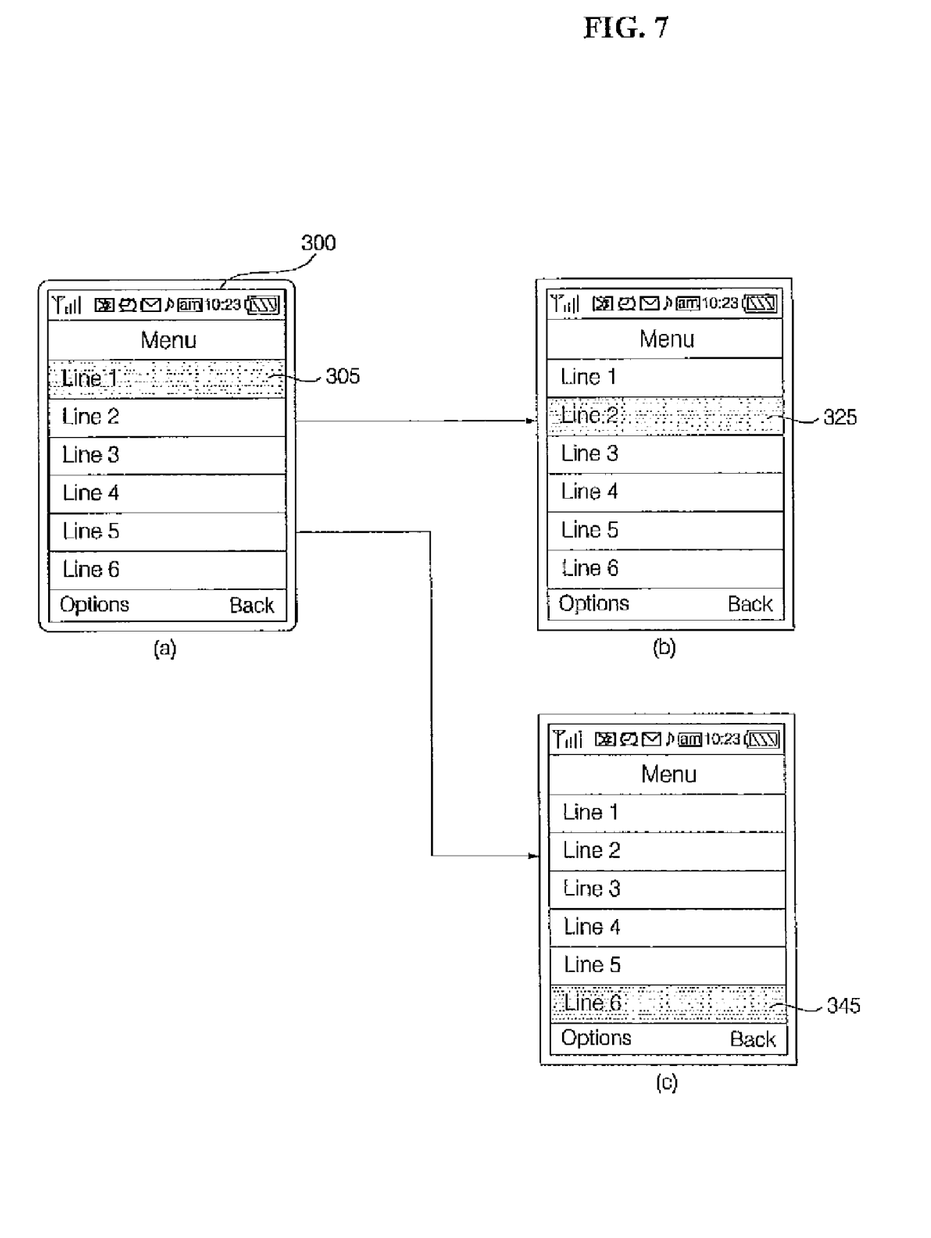
FIG. 7 is a diagram describing an operating method of a mobile communication terminal with a screen displayed on a display unit according to an embodiment of the present invention.

FIG. 7 is a diagram for describing an operating method of a mobile communication terminal with a screen displayed on a display unit according to an embodiment of the present invention.

A diagram (a) of FIG. 7 illustrates a predetermined list 300 displayed on a display unit. A reference numeral 305 denotes a currently selected item. If a user turns the first input key 150, the displayed list 300 is scrolled at a normal speed as shown in a diagram (b) of FIG. 7. A reference numeral 325 denotes a currently selected item in the diagram (b) of FIG. 7.

As shown in a diagram (c) of FIG. 7, if a user activates one of the second input key 160 and the third input key 165 after turning the first input key 150, the displayed list is scrolled at a faster speed than the normal speed. A reference numeral 345 denotes a currently selected item in the diagram (c) of FIG. 7. In this case, the speed of scrolling the screen increases gradually in proportion to a time of activating one of the second and third input keys 160 and 165. That is, a power scroll may be enabled through the second and third input keys 160 and 165.

As described above, a user can control a speed of scrolling a displayed screen by activating one of the second and third input keys 160 and 165 after turning the first input key 150 and select a desired list item by pushing the first input key 150.

Figure 8:
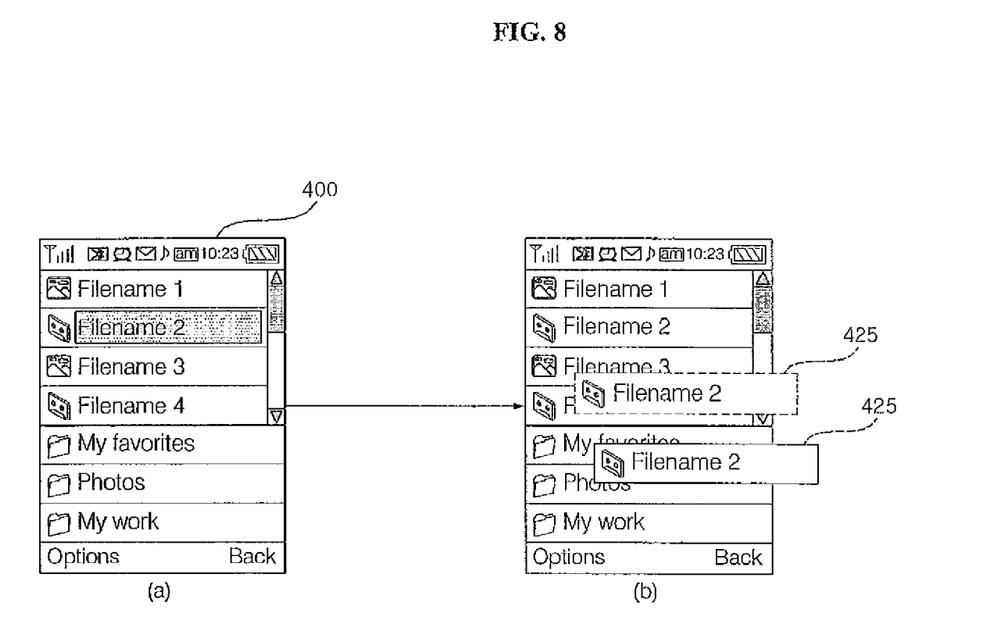
FIG. 8 is a diagram describing an operating method of a mobile communication terminal with a screen displayed on a display unit according to an embodiment of the present invention.

Meanwhile, the mobile communication terminal according to the present embodiment may provide a drag and drop function using the first input key 150 and the second and third input keys 160 and 165. That is, a user selects a predetermined file from a screen 400 where files and folder are arranged by pushing the first input key 150. Then, the user moves the selected file 425 in a drag and drop manner by activating one of the second and third input keys 160 and 165. After moving the selected file to a desired folder, the user drops the selected file into the desired folder by pushing the first input key 150 again. As described above, the mobile communication terminal according to the present embodiment can provide the drag and drop function like that provided from the computing environment.

As described above, a user can control a screen in various ways using the rotary input key and the input keys that are disposed adjacent to the rotary input key according to the present embodiment. For example, a user can control the scrolling speed differently using the rotary input key and the input keys. Therefore, the convenience of a user can be improved because the user can effectively control a mobile communication terminal having a limited size.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of operating a mobile communication terminal having a screen, a first input key, a first proximity sensor key, and a second proximity sensor key, the method comprising:
   scrolling a displayed screen at a first speed when the first input key is turned
   scrolling the displayed screen at a second speed in a first direction when the first proximity sensor key is activated after the first input key is turned;
   scrolling the displayed screen at a third speed in a second direction different from the first direction when the second proximity sensor key is activated after the first input key is turned, the third speed being the same as or different from the second speed;
   stopping the scrolling of the displayed screen by gradually decreasing a scrolling speed of the displayed screen instead of instantly stopping the scrolling of the displayed screen when the first or second proximity sensor key is deactivated; and
   re-scrolling the displayed screen at the first speed when the first input key is turned again after the first or second proximity sensor key is deactivated,
   wherein the first input key is one of a wheel key and a rotary key,
   wherein the second and third speeds have respective initial values that are faster than the first speed, and
   wherein the second and third speeds are increased from their respective initial values in proportion to a time of activating the respective first or second proximity sensor key.

2. The method of claim 1, further comprising:
   generating a first signal when the first input key is turned;
   one of
      generating a second signal when the first proximity sensor key is activated after the first signal is generated, and
      generating a third signal when the second proximity sensor key is activated after the first signal is generated; and
   increasing the second speed in proportion to a duration of the corresponding one of the second signal and the third signal.

3. The method of claim 2, further comprising:
   generating a fourth signal when the first input key is pushed.

4. The method of claim 3, further comprising:
   moving a pointing cursor on the displayed screen according the first signal; and
   selecting an item indicated by the pointing cursor when the fourth signal is generated.

5. The method of claim 4, further comprising:
   selecting an item indicated by the pointing cursor when the fourth signal is generated and moving the selected item in a drag and drop manner.

6. A mobile communication terminal, comprising
a first input key configured to generate a first signal when the first input key is turned;
a first proximity sensor configured to generate a second signal when the second input key is activated after the first signal is generated;
a second proximity sensor configured to generate a third signal when the third input key is activated after the first signal is generated; and
a controller configured to scroll a displayed screen at a first speed when the first signal is generated, and to scroll the displayed screen at a second speed when the second signal is generated and a third speed when the third signal is generated, the third speed being the same as or different from the second speed,
wherein the controller is further configured to stop scrolling the displayed screen by gradually decreasing a scrolling speed of the displayed screen instead of instantly stopping the scrolling of the displayed screen when the first or second proximity sensor key is deactivated,
wherein the first input key is one of a wheel key and a rotary key,
wherein the controller is further configured to re-scroll the displayed screen at a first speed when the first input key is turned again after the first or second proximity sensor key is deactivated, and
wherein the second and third speeds have respective initial values that are faster than the first speed and
wherein the second and third speeds are increased from their respective initial values in proportion to a time of activating the respective first or second proximity sensor key.

7. The mobile communication terminal of claim 6, wherein the first input key, the first proximity sensor key, and the second proximity sensor are disposed at a side of a main body.

8. The mobile communication terminal of claim 6, wherein the first proximity sensor is disposed at the top of the first input key and the second proximity sensor is disposed at the bottom of the second input key.

9. The mobile communication terminal of claim 6,
wherein the controller is configured to scroll the displayed screen in a first direction when the second signal is generated, and to scroll the displayed screen in a second direction when the third signal is generated, and
wherein the second direction is different from the first direction.

10. The mobile communication terminal of claim 6, wherein the first input key is configured to generate a fourth signal when the first input key is pushed.

11. The mobile communication terminal of claim 10, wherein the controller is configured to move a pointing cursor on the displayed screen according to the first signal, and to select an item indicated by the pointing cursor when the fourth signal is generated.

12. The mobile communication terminal of claim 11, wherein the controller is configured to select an item indicated by the pointing cursor when the fourth signal is generated, and to move the selected item in a drag and drop manner when one of the second signal and the third signal is generated.

* * * * *